United States Patent Office 3,028,426
Patented Apr. 3, 1962

3,028,426
PROCESS FOR THE MANUFACTURE OF SOLID MONOMERIC CARBOXYLIC ACID AMIDES
Daniel Porret, Monthey, and Arthur Maeder, Basel, Switzerland, assignors to Ciba Limited, Basel, Switzerland, a Swiss firm
No Drawing. Filed Jan. 31, 1955, Ser. No. 485,311
Claims priority, application Switzerland Feb. 2, 1954
5 Claims. (Cl. 260—561)

It is known that acrylic acid amide can be obtained, for example, by treating acrylic acid nitrile in the presence of a polymerisation inhibitor, such as copper or iron, at a raised temperature with sulfuric acid and water, and neutralizing the resulting reaction mass with an alkaline agent, for example with ammonia gas, sodium carbonate, quicklime or calcium carbonate. For the purpose of isolating the acrylic acid amide formed, the neutralized mixture is extracted with a suitable organic solvent, such as isopropanol, and the amide solution is then evaporated to dryness in vacuo. If the aforementioned reaction mass is neutralized with quicklime or calcium carbonate, the acrylic acid amide can be obtained by filtering off the calcium sulfate and evaporating the aqueous filtrate under reduced pressure.

The present invention is based on the observation that solid monomeric carboxylic acid amides can be obtained by drying aqueous solutions of monomeric water-soluble amides of the acrylic series, for example aqueous solution of methacrylic acid amide or preferably of acrylic acid amide with the aid of a spray drier, these solutions containing such a slight quantity of a polymerisation inhibitor that a catalyzed and, if desired, activated polymerisation or copolymerisation is not adversely affected when using the resulting monomeric acid amide.

As polymerisation inhibitors, which are to be contained in the aqueous monomeric acid amide solutions, there come into consideration the water-insoluble and particularly water-soluble substances known in the literature which inhibit the polymerisation of acrylic compounds. There may be mentioned for example, sulfur, iron and its salts, hydroquinone, cresol and diphenylamine. However, it is of advantage to use copper which can be present in the aqueous monomeric acid amide solutions either in the form of a water-soluble, if desired, complex compound or as a finely dispersed metal powder. In the place of a single inhibitor there may also be used two or several such substances. The polymerisation inhibitors mentioned should be contained in the starting solutions in such a small quantity that their presence in the solid monomeric product does not make the latter unsuitable for a later catalyzed polymerisation or copolymerisation, for example with per-compounds, and if desired an activated polymerisation or copolymerisation with an activator, such as triethanolamine. In copper, for example, the amount is about 0.02–0.002 percent by weight calculated on the weight of the monomeric acid amide present in the aqueous solution.

The aqueous acid amide solutions containing polymerisation inhibitors in the given quantity are subjected to drying in known spray driers advantageously at a low temperature, whereby solid monomeric acid amide, for example acrylic acid amide is formed as a white, crystalline powder which contains an insignificant quantity of polymerised components.

Especially advantageous for the present invention is the use of starting solutions of acrylic acid amide which are obtained by reacting acrylic acid nitrile in the presence of a quantity of copper corresponding to the aforementioned data at a raised temperature with sulfuric acid and water, neutralizing the resulting mass with quicklime or calcium carbonate and removing the calcium sulfate by filtration.

The following examples illustrate the invention, the parts being by weight unless otherwise stated and the relation between part by weight and part by volume being the same as that between the kilogram and the liter.

*Example 1*

4950 parts of an aqueous solution of acrylic acid amide of 19.2 percent strength, the preparation of which is described below, are atomized and dried in a spray drier in the usual manner at as low a temperature as possible. In this manner there are obtained 980 parts of acrylic acid amide of about 95 percent strength in the form of a white crystalline powder which contains no water-insoluble components and can be readily polymerized or copolymerized in known manner.

The starting solution can be prepared as follows: A mixture consisting of 1400 parts of concentrated sulfuric acid, 0.1 part of copper powder and 220 parts by volume of water is heated to 60° C. 742 parts of acrylonitrile are added while cooling in the course of 35 minutes and the temperature is allowed to rise to 100° C. The reaction mixture is left at this temperature for an hour, is then cooled and 4500 parts by volume of water are added with further cooling. The reaction mixture is then neutralized with 1400 parts of calcium carbonate while stirring vigorously, and stirring is continued for an hour. The pH value of the solution should be 7.5. The mixture is filtered off from the precipitated calcium sulfate which is washed well with water. There are thus obtained 4950 parts of an aqueous acrylic acid amide solution of 19.2 percent strength.

*Example 2*

An aqueous solution of methacrylic acid amide of about 20 percent strength which has been obtained by treating methacrylonitrile with concentrated sulfuric acid in the presence of 0.01% copper powder (calculated on the acid amide) and then neutralizing with calcium carbonate, is atomized and dried in an analogous manner to that described in Example 1. There is obtained in good yield methacrylic acid amide of about 95 percent strength which occurs in the form of a colorless crystalline powder and can be polymerized in known manner.

*Example 3*

An aqueous methacrylic acid amide solution of 18 to 20 percent strength, the preparation of which is described below, is atomized and dried in the manner described in Example 1. There are obtained 830 parts of methacrylic acid amide of about 95 percent strength as a colorless crystalline powder which can be polymerized or copolymerized in known manner.

To 1500 parts of sulfuric acid of 98 percent strength, which are obtained by mixing 335 parts by volume of fuming sulfuric acid (15% $SO_3$ content) and 480 parts by volume of sulfuric acid having a specific gravity of 1.84 and to which 0.1 part of copper powder has been added, there are added gradually dropwise and with stirring 850 parts of acetone-cyanohydrin. Care should be taken to maintain the temperature at 76 to 80° C. by cooling. After the addition of the acetone-cyanohydrin is complete, the mixture is heated for 2 hours at 120 to 125° C., then cooled and the reaction mixture is poured into 4500 parts by volume of water with cooling. The resulting aqueous solution is then carefully neutralized with calcium carbonate while stirring vigorously. The precipitated calcium sulfate is then filtered off, washed well with water and the wash water combined with the filtrate. This aqueous methacrylic acid amide solution of about 18–20 percent strength is then put into the spray drier.

What is claimed is:

1. A process for the manufacture of a solid monomeric carboxylic acid amide, which comprises spray drying an aqueous solution of methacrylic acid amide, in the presence in the solution of about 0.02 to 0.002 percent of copper in the form of a water-soluble copper compound, calculated on the weight of methacrylic acid amide, whereby a catalyzed and activated polymerisation and copolymerisation of the resulting methacrylic acid amide is not adversely affected.

2. A process for the manufacture of a solid monomeric carboxylic acid amid, which comprises spray drying an aqueous solution of acrylic acid amide, in the presence in the solution of about 0.02 to 0.002 percent of copper in the form of a water-soluble copper compound, calculated on the weight of acrylic acid amide, whereby a catalyzed and activated polymerisation and copolymerisation of the resulting acrylic acid amide is not adversely affected.

3. A process for the manufacture of a solid monomeric carboxylic acid amide, which comprises spray drying an aqueous solution of acrylic acid amide, the solution containing about 0.02 to 0.002 percent of copper calculated on the weight of the monomeric acrylic amide and the copper being present in the form of a water-soluble compound.

4. A process for the manufacture of a solid monomeric carboxylic acid amide which comprises spray drying an aqueous acrylic acid amide solution which has been obtained by treating acrylonitrile in the presence of about 0.02 to 0.002 percent of copper calculated on the expected amount of acrylic acid amide, with sulfuric acid and water at a raised temperature, neutralizing the mixture with a member selected from the group consisting of calcium hydroxide and calcium carbonate, and separating off the calcium sulfate by filtration.

5. A process for the manufacture of a solid monomeric carboxylic acid amide, which comprises spray drying an aqueous solution of a monomeric water-soluble amide selected from the group consisting of acrylic acid amide and methacrylic acid amide in the presence in the solution of about 0.02 to 0.002 percent of copper in the form of a water-soluble copper compound, calculated on the weight of the said monomeric water-soluble amide, whereby a subsequent catalyzed and activated polymerization and copolymerization of the resulting monomeric acid amide is not adversely affected.

References Cited in the file of this patent

UNITED STATES PATENTS

| | | |
|---|---|---|
| 2,187,877 | Ferris et al. | Jan. 23, 1940 |
| 2,436,355 | Cadot et al. | Feb. 17, 1948 |
| 2,481,092 | Dunn et al. | Sept. 6, 1949 |

FOREIGN PATENTS

| | | |
|---|---|---|
| 611,252 | Great Britain | Oct. 27, 1948 |
| 631,592 | Great Britain | Nov. 7, 1949 |

OTHER REFERENCES

Fleming: "J. Ind. and Eng. Chem.," Vol. 13 (1921), pp. 447–449.

Smith: J. Soc. Chem. Ind., October 1946, page 313.

Weissberger—Separation and Purification, pages 821–822, Interscience Publishers, Inc., New York, 1956.